June 28, 1932.   A. M. CANDY   1,865,169
WELDING ELECTRODE
Filed July 27, 1927

INVENTOR
Albert M. Candy.
BY
ATTORNEY

Patented June 28, 1932

1,865,169

UNITED STATES PATENT OFFICE

ALBERT M. CANDY, OF WILKINSBURG, PENNSYLVANIA, ASSIGNOR TO WESTINGHOUSE ELECTRIC & MANUFACTURING COMPANY, A CORPORATION OF PENNSYLVANIA

WELDING ELECTRODE

Application filed July 27, 1927. Serial No. 208,696.

My invention relates to metallic electrodes particularly adapted for automatic arc welding.

It is frequently necessary or desirable to incorporate, with arc welding electrodes, a welding flux or arc-sustaining material for the purpose of stabilizing the arc and preventing the inclusion of deleterious materials. My invention is concerned with electrodes in which such welding flux is employed.

An object of my invention is to provide an electrode of the class described in which the flux is held within longitudinally extending recesses distributed substantially uniformly over the surface of the electrode, thus protecting the flux from abrasion or flaking, and producing an electrode which is rugged in construction and which may be coiled, shipped and handled with no more care than is required with common bare electrode wire.

A further object of my invention is to provide an electrode of the class described, which may be simply and inexpensively manufactured and which shall lend itself to quantity production while still maintaining a high degree of uniformity in the manufactured product.

A further object of my invention is to provide an electrode of the class described which shall be provided with ample conducting surfaces whereby the electrode may be fed through the rolls or sliding contacts of automatic arc welding machines and the welding current be readily conducted thereto.

In carrying the objects of my invention into effect, I form an electrode of welding material, such as iron, and incorporate, on substantially equi-spaced longitudinally extending portions of its surface, fluxing materials having an arc-stabilizing action and a stronger affinity for oxygen and nitrogen than the welding metal itself.

In embodying the subject matter of my invention in a practical form, I draw a plurality of shallow longitudinal grooves or recesses in the electrode surface and either partially or completely fill such grooves with an arc-sustaining fluxing material. To facilitate the retention of the fluxing material within the recesses, I may mix it with a suitable binding cement. A convenient method of applying the fluxing material is to pass the grooved rod through a paste, partially or completely cleaning the surface of surplus flux and removing the water or solvent present in the paste, by drying the fluxed rod either at atmospheric or at some elevated temperature.

Various well known substances are adapted for use in my new electrode as fluxing and binding materials, among which I prefer to use calcium carbonate or calcium hydrate, magnesium oxide or calcium oxide and some alkali silicate.

In the use of electrodes of the prior art in automatic welding machines, difficulty has been experienced in securing uniformly satisfactory welds. When employing bare electrodes, the irregular evolution of gases and varying evaporation of materials characteristic of such electrodes produces a change in the degree of fusion of the deposited metal to the work's surface and a varying degree of surface oxidization because of the flickering of the arc stream under the changing forces to which it is subjected. The condition just mentioned frequently results in the production of a series of pinholes and slag pockets in the deposited metal and, therefore, an imperfect joint.

When manually welding with bare electrodes, the objectionable features just mentioned are avoided to some extent by the proper hand manipulation of the electrode to conform to the variations occurring in the arc. Such manipulation, however, greatly adds to the duties imposed upon the operator.

To overcome the disadvantageous features characteristic of bare electrodes, an effort has been made to utilize completely covered electrodes. However, as the coatings best suited for fluxing materials have a high electrical resistance, it has been found impractical to feed the welding current to such electrodes, either by means of sliding contacts or knurled rolls. When sliding contacts are employed, the insulation resistance of the flux coating is too great to pass the desired current, and, when knurled rolls are utilized with sufficient pressure to cut through the coating, such cutting action causes the coating material to flake from the surface of the rod.

In the development of electrodes specifically for use with automatic machines, it has been proposed, as disclosed in United States Patent No. 1,525,840 to J. M. Weed, to utilize a coated electrode, the coating of which is inclosed within a metallic sheath. In this type of electrode, current is conducted from a sliding contact to the metallic sheath, and through a large area of an intermediate insulating flux coating to the metallic electrode core. I have found, however, when feeding such an electrode through the rolls of an automatic welding machine, that the section of the electrode is deformed in varying amounts, thereby causing a movement or displacement of the arc terminal which produces an erratic arc performance. The wavering of the arc produces irregularities in the deposit similar to the irregularities secured when using bare electrodes.

To secure the degree of electrical contact obtainable with bare electrodes and the stabilizing effect of flux-covered electrodes, an effort has been made to utilize bare electrodes having single flux-filled grooves in automatic welding machines. A thorough trial of such electrodes has disclosed that the unbalanced forces created by the evolution of gases, on the disintegration of the flux contained in the single recess, produces a violent disturbance of the arc and, therefore, no substantial improvement is secured in the character of the deposited metal over that obtained when using bare electrodes.

In my present invention, I have combined the desirable features of the bare electrode and the coated electrode by distributing the flux in longitudinal strips around the electrode surface to obtain a substantially balanced gaseous reaction on the arc stream, while providing an adequate area of bare electrode surface in contact with the current-conducting members to facilitate the transfer of the welding current to the electrode.

Referring to the accompanying drawing forming a part hereof,

The body 1 of the electrode is composed of any suitable welding material, usually low-carbon iron, having formed thereon a series of longitudinal strips 2, of arc-sustaining fluxing material. As a specific example of a composition which I have found suitable for the purpose, the fluxing material may be a mixture of calcium carbonate and sodium silicate.

Figure 1:
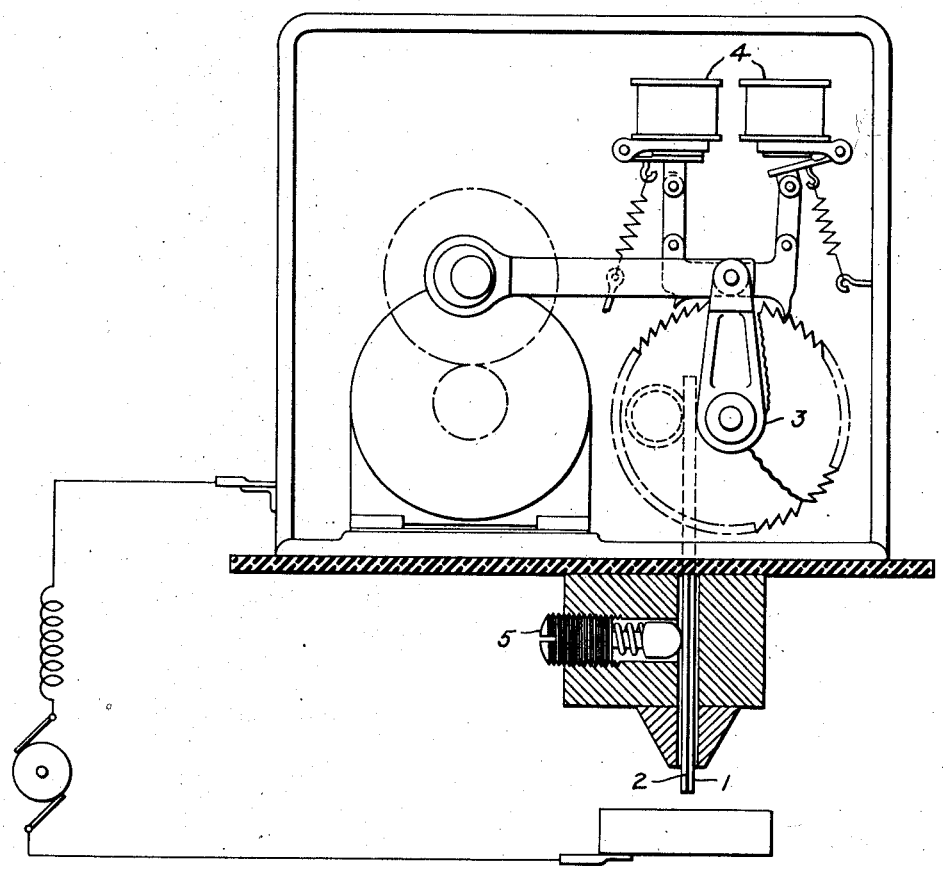
Figure 1 is a diagrammatic view, partly in vertical section, showing my invention adapted for use with an automatic electrode-feeding apparatus.

My electrode is particularly designed for use in an automatic arc-welding machine such as that shown in Fig. 1 and described in detail in a United States Patent No. 1,689,882 to Allis M. MacFarland, and assigned to the Westinghouse Electric & Manufacturing Co. The electrode is fed or retracted by means of feed rolls 3, controlled by electro-responsive means 4. The welding current may be transferred from the machine to the electrode by means of either the feeding rolls 3 or a sliding contact member 5.

Figure 2:
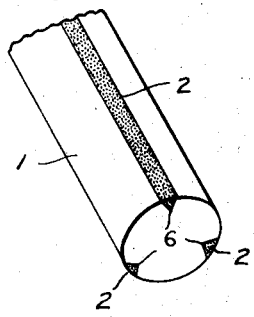
Figs. 2, 3 and 4 are perspective views of electrodes embodying my invention.
Figure 3:
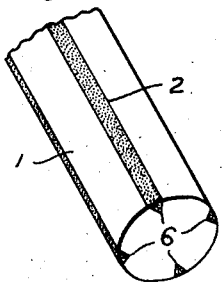
Figure 4:
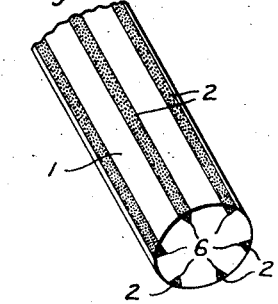

While I have found that strips of longitudinally extending flux on the electrode surface are adequate for use with electrodes of large diameter, it is more desirable, when employing electrodes having a diameter of $\frac{3}{16}$ of an inch or less, to secure the flux to the surfaces of recesses 6, formed in the electrode surface, as shown in Figs. 2, 3 and 4. The recesses are preferably only partially filled with flux, so that the establishment of a satisfactory electrical contact between the electrode and the contact member 5 may be facilitated.

In practice, I find that, to secure a minimum permissible arc stability, it is necessary to provide at least two of such recesses 6, and to insure a really adequate distribution of the flux material around the arc stream, more than two grooves should ordinarily be employed.

From a standpoint of securing sufficient conductivity in the sliding contact between the electrode and the contact member 5, it is desirable that the area of the bare electrode exposed between the flux-containing recesses should preferably exceed $\frac{2}{3}$ that of the total electrode surface and it is further desirable that a large number of narrow grooves 6 be utilized in preference to one or two wide grooves or recesses. The depth of the recesses may vary considerably, but, in small electrodes having a diameter of $\frac{3}{16}$ of an inch, the depth of the grooves should preferably be not less than .02 of an inch.

In Figs. 2, 3 and 4, the numbers of grooves employed in my electrodes are 3, 4 and 6, respectively. In actually drawing the wires with the different numbers of grooves, an unsuspected advantage was discovered in the use of an even number of grooves, as the compression stresses of the dies are directly opposed and, therefore, neutralize each other to avoid displacement stresses on the wire, when the grooves are diametrically opposite one another.

I have found that my electrode is inexpensive to manufacture, produces a stable arc, facilitates the conduction of welding current during the feeding process and prevents the flaking of the coated material during handling and also while the electrode is being fed or retracted between the knurled rolls of an automatic welding machine.

Although I have described specifically an electrode substantially of iron with coated strips of calcium carbonate mixed with a silicate binder and held to recesses which are illustrated as being of V shape, it is to be understood that such construction is merely illustrative of my invention and does not define the scope thereof. It is obvious that many materials are available and that a variety of forms of recesses may be utilized for producing electrodes in accordance with the present invention. I desire, therefore, that the appended claims shall be given the broadest interpretation consistent with their terms and the prior art.

I claim as my invention:

1. An arc welding electrode comprising a welding metal having a plurality of substantially straight longitudinally-extending recesses approximately equally spaced from each other about the periphery of said electrode and a flux within said recesses.

2. An arc welding electrode comprising a welding metal having more than two substantially straight longitudinally-extending recesses approximately equally spaced from each other about the periphery of said electrode and a flux, including materials having arc sustaining properties, within said recesses.

3. An arc welding electrode comprising a welding metal having a plurality of substantially straight longitudinally-extending recesses equi-spaced about the periphery of said electrode and a flux firmly held within said recesses.

4. An arc welding electrode comprising a welding metal having a plurality of oppositely-spaced longitudinally extending recesses therein and a flux within said recesses, said flux including a refractory binder holding said flux within said recesses.

5. An arc welding electrode comprising a welding metal having a plurality of substantially straight longitudinally-extending recesses approximately equally spaced from each other, said recesses being partially filled with a fluxing material.

6. An arc welding electrode comprising a welding metal having a plurality of pairs of oppositely spaced longitudinally extending recesses distributed substantially uniformly around the surface of the said electrode and a flux partially filling said recesses.

7. An arc welding electrode wire having conducting surfaces adapted to facilitate the conduction of current into the side of the wire by a relatively moving contact, said electrode having a plurality of substantially straight longitudinally-extending bare surfaces separated by flux-coated surfaces, said bare surfaces being approximately equally spaced around the periphery of the electrode.

8. An arc welding electrode wire having conducting surfaces adapted to facilitate the conduction of current into the side of the wire by a relatively moving contact, said electrode comprising a low-carbon iron rod provided with a plurality of substantially straight recesses approximately equally spaced around the periphery thereof, and a fluxing material having arc-sustaining properties and including a silicate binder firmly held to the said recessed surfaces.

9. A welding rod of generally circular cross section having provided in the surface thereof a plurality of straight parallel lengthwise ranging grooves approximately equally spaced about the periphery of the rod and having inlays of material adapted to stabilize an arc filling and confined to the grooves.

10. An arc welding electrode comprising a welding metal having a plurality of longitudinally extending recesses approximately equally spaced about the periphery thereof and a flux within said recesses, thereby forming a rod having a plurality of bare surfaces and a plurality of flux-coated surfaces, the bare surface constituting at least two-thirds of the surface of the rod.

In testimony whereof, I have hereunto subscribed my name this 20th day of July 1927.

ALBERT M. CANDY.